United States Patent
Fujii et al.

(10) Patent No.: US 6,998,743 B2
(45) Date of Patent: Feb. 14, 2006

(54) STATOR INCORPORATING DRIVE CIRCUIT AND AXIAL-GAP BRUSHLESS MOTOR COMPRISING SAME STATOR

(75) Inventors: Kentaro Fujii, Isesaki (JP); Masahiro Takagi, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 10/963,924

(22) Filed: Oct. 12, 2004

(65) Prior Publication Data
US 2005/0099072 A1 May 12, 2005

(30) Foreign Application Priority Data
Oct. 10, 2003 (JP) .............................. 2003-351920

(51) Int. Cl.
*H02K 7/06* (2006.01)
(52) U.S. Cl. ...................................................... 310/81
(58) Field of Classification Search ................ 310/81, 310/71, 67 R, 68 D, 235
See application file for complete search history.

(56) References Cited

FOREIGN PATENT DOCUMENTS

| JP | 54-24053 | 7/1952 |
| JP | 2-13255 | 1/1990 |
| JP | 4-137463 | 12/1992 |
| JP | 3009066 | 1/1995 |
| JP | 7-75318 | 3/1995 |
| JP | 7-30570 | 6/1995 |
| JP | 2000-12992 | 1/2000 |
| JP | 2000-245103 | 9/2000 |
| JP | 2002-142427 | 5/2002 |
| JP | 2002-143767 | 5/2002 |

*Primary Examiner*—Darren Schuberg
*Assistant Examiner*—Leda Pham
(74) *Attorney, Agent, or Firm*—Jordan and Hamburg, LLP

(57) ABSTRACT

A brushless motor has a drive circuit component mounted on a stator which has plating conducted on a copper foil land to facilitate soldering. Need for a plating line from the outside is eliminated by providing an internal plating connection trace connected to a power feed terminal portion which is subsequently cut by a guide hole for an armature coil. An adhesive resin is applied to the stator where the circuit drive component is installed and the guide hole to adhere simultaneously to the stator to a bracket and the armature coil to the stator and bracket.

11 Claims, 2 Drawing Sheets

STATOR INCORPORATING DRIVE CIRCUIT AND AXIAL-GAP BRUSHLESS MOTOR COMPRISING SAME STATOR

BACKGROUND

The present invention relates to an axial-gap brushless motor that can be made flat and is advantageous for applications as a soundless alarm for mobile communication devices. More specifically, the present invention relates to a stator incorporating a drive circuit component and an axial-gap brushless motor comprising same stator.

Brushless motors include a drive circuit replacing a brush and a commutation unit.

The applicant of the present application has suggested a vibration motor employing such a motor, as a flat axial-gap brushless motor in Japanese Utility Model Application Laid-open No. 4-137463, and Japanese Patent Application Laid-open No. 2002-143767 (FIG. 4–FIG. 5).

A vibration motor in which a drive circuit component is disposed on a side of a stator is known as a cored-type vibration motor and disclosed in Japanese Patent Application Laid-open No. 2000-245103.

Further, the applicant of the present application has suggested removing some of a plurality of armature coils in the cored-type and coreless configuration and disposing a drive circuit component in the empty space as disclosed in Japanese Patent Application Laid-open No. 2002-142427 (FIG. 8–FIG. 11).

However, in order to integrate a drive circuit component and incorporate it as a chip component, copper foil lands for mounting the chip component by soldering must be plated to facilitate soldering. A plating conductor trace for supplying electric current for plating the lands from the outside is provided for effecting plating of the lands.

SUMMARY OF THE INVENTION

Briefly stated, the present invention provides a brushless motor incorporating a drive circuit component and which has plating conducted on copper foil lands to facilitate soldering, wherein it is not necessary to provide a plating line from outside, in addition to the power feed terminal portion, and strength is ensured by specifying positions of internal plating traces, despite the decrease in thickness of each component. The internal plating traces are cut by guide holes for mounting armature coils after plating is effected.

Accordingly, the present invention provides a brushless motor incorporating a drive circuit component that can be handled similarly to a usual DC motor, and has plating conducted on copper foil lands to facilitate soldering, wherein it is not necessary to provide an extra plating conductor line from the outside, such a line creating a problem of insulation from the yoke bracket, and strength is ensured by specifying a position of the internal plating line, even as the components are made thinner.

In order to resolve the above-described problem, a stator incorporating a drive circuit is composed of a bracket formed from a nonmagnetic or weakly magnetic metal plate, having a shaft support portion disposed in a central portion, and a brush base composed of a stator base printed circuit mounted on the bracket and having a power feed terminal installation portion in an outer peripheral portion, hollow armature coils mounted on the brush base, and a drive circuit component for controlling electric current flowing in the hollow armature coil, wherein the printed circuit has at least one internal plating connection conductor trace which provides continuity from the power feed terminal portion provided in the outer peripheral portion of the brush base to the copper foil lands for purposes of plating, the at least one internal plating connection trace is at least partially removed after plating by at least one separation hole for cutting the plating connection trace to open the plating connection land circuit, and an adhesive resin is applied to a surface of the brush base where the drive circuit component is disposed, the adhesive resin adheres to the bracket via the separation hole and the brush base is fixed to the bracket.

Because the plating connection trace is formed extending from the power feed terminal portion, the additional insulation, which is necessary when a new power feed portion is provided, is not required in the brush base formed on the printed wiring board. Further, because the adhesive resin is applied to the surface where the circuit drive component is installed, including the separation hole for cutting the printed wiring, the adhesive resin adheres simultaneously to the bracket and the brush base to fix together the brush base and the bracket.

Further, the hollow armature coils are flat coils and the separation holes are provided in an inner-diameter position of the hollow armature coils. If an opening is provided in the inner-diameter portion of the hollow armature coils, other areas of the brush base can be used effectively. Furthermore, the separation holes can be used for positioning the coil.

The present invention further provides in the above noted embodiments, an axial gap eccentric rotor rotatably attached to the stator via a shaft, wherein the eccentric rotor is composed of an axial-gap magnet having a plurality of magnetic poles in a rotor yoke and an eccentric weight rotating integrally with the rotor yoke and magnet, and a cover composed of a nonmagnetic or weakly magnetic metal sheet and covering the eccentric rotor fixed to the stator. Such a configuration is particularly suitable for a vibration motor.

In accordance with the present invention, when plating copper foil lands employed for mounting a drive circuit component, the power feed terminal serving as two (positive and negative) terminals can be used as an input line for a plating current and it is not necessary to provide another plating input line extending to an outer periphery. Therefore, the problem of insulation does not arise during assembling in a housing. Furthermore, the plating line separation hole can be used for positioning the hollow armature coils and fixing together the components constituting the stator.

DETAILED DESCRIPTION

Figure 1:
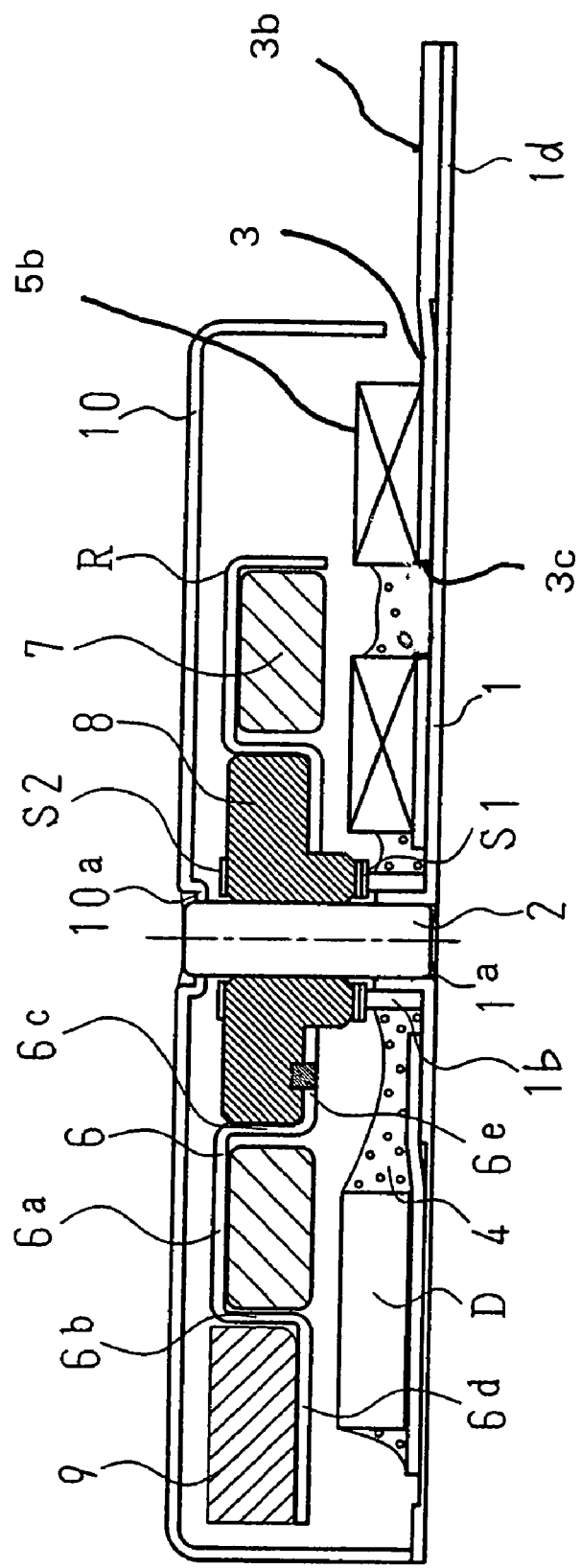
FIG. 1 is a side elevation cross-sectional view of a brushless motor accordance with the present invention taken along line I—I of FIG. 2, applied, for example, in a vibration motor.
Figure 2:
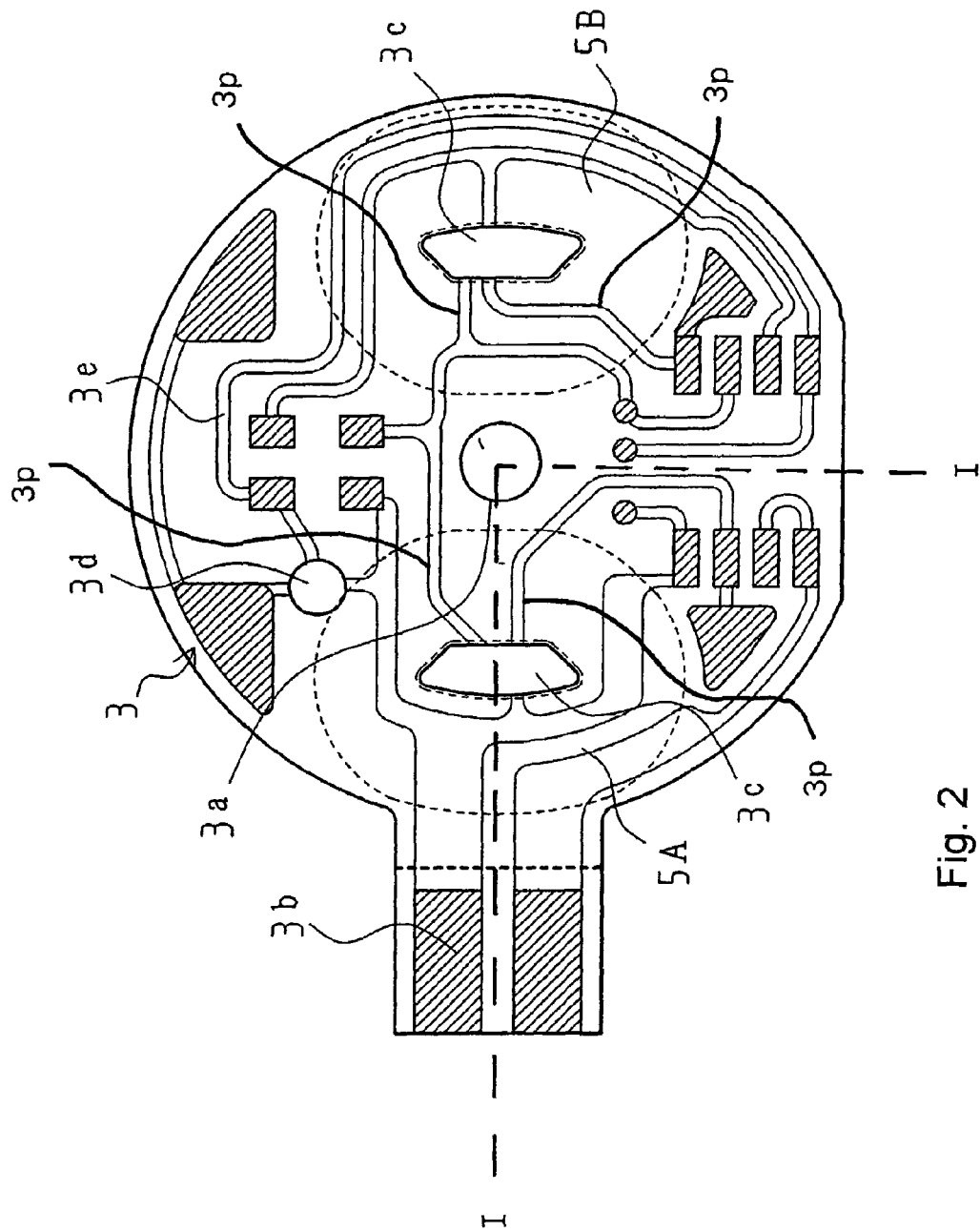
FIG. 2 is a plan view of a stator of the brushless motor in accordance with the present invention.

Referring to FIGS. 1 and 2, brushless motor of the present invention is embodied as a vibration motor and comprises a stator composed of a bracket 1, a stator base 3 which is optionally formed as a flexible printed circuit, and a drive circuit component D mounted on the stator base 3. A shaft 2 is mounted in a center of the bracket 1, a rotor R is rotatably supported on the shaft 2, and a cover member 10 is mounted on the bracket 1 and securing the shaft 2.

The bracket 1 is optionally formed of a thin sheet with a thickness of about 0.1 mm, which is an austenitic stainless steel sheet that is nonmagnetic or has weaker magnetic properties than an iron sheet. A center of the bracket 1 has a shaft support portion 1a raised in the form of a burring and a cylindrical reinforcing member 1b produced from tool bronze press inserted thereon. A detent torque generating portion for retaining the rotor R in position when the rotor R is stopped is formed around the shaft support portion 1a. This detent torque generating portion is not directly related to the invention of the present application and the explanation thereof is omitted.

Part of an outer shape of the bracket 1 protrudes as a rectangular section in a radial direction and constitutes a power feed terminal installation portion 1d.

In the shaft support portion 1a of the bracket 1 of the above-described configuration, a shaft 2 with a diameter of 0.5 to 0.6 mm is fixed by press fitting or the like, and the stator base 3 composed of a flexible printed wiring board is disposed around the shaft 2 in the plane of the bracket 1.

The rotor R, which is rotatably supported on the shaft 2, is composed of a rotor yoke 6 made from magnetic stainless steel, an axial-gap magnet 7 mounted on the rotor yoke 6, and a flanged sintered oil-impregnated bearing 8 mounted within an inner-diameter portion of the magnet 7.

The rotor yoke 6 is a thin plate with a thickness of 0.1 mm having formed therein a flat portion 6a for receiving the magnet 7, outer-diameter portion 6b and tab piece 6d supporting an arc shaped eccentric weight 9, and a cylindrical inner-diameter portion 6c and a flange 6e protruding inwardly in the horizontal direction holds the sintered oil-impregnated bearing 8. The sintered oil-impregnated bearing 8 is fixed to the rotor yoke 9 by caulking, spot welding, or the like. The eccentric weight 9 is fixed to the rotor yoke 9 by adhesive bonding, welding, or the like. The eccentric rotor R is rotatably attached to the shaft 2 via a thrust washer S1 having two layers which reduce friction loss.

The eccentric rotor R is covered with a cover member 10 formed to have a cylindrical cap-like shape from a thin nonmagnetic stainless steel. The distal end of the shaft 2 is fitted via a thrust washer S2 into a burring hole 10a formed in the center of the cover member 10. The burring hole 10a is smaller than the shaft diameter and recessed so that a distal end of the shaft 2, pressed in the burring hole 10a, does not protrude therefrom. The distal end portion is laser welded to the aforementioned cover member 10 in order to prevent deformation, and the cover member 10 is attached by laser spot welding to an outer periphery of the aforementioned bracket 1.

Therefore, because assembling is thus conducted by welding, the entire configuration has a monocoque structure. As a result, a sufficient strength can be obtained even though thin members are used.

The stator base 3 is formed to be almost identical in shape but somewhat smaller than the bracket 1, and the shaft 2 is passed through a central hole 3a provided in a center of the stator base 3. Part of the stator base 3 is extended to have a rectangular shape and disposed as a power feed terminal portion 3b on the power feed terminal installation portion 1d.

A guide hole 3c, which is a through hole, is provided in the stator base 3, and two hollow armature coils 5A, 5B are disposed opposite each other using the guide hole 3c. Furthermore, one Hall sensor (in FIG. 2, only the wiring pattern is shown) and an IC-based drive circuit component D (in FIG. 2, only the wiring pattern is shown) facing the Hall sensor are disposed between the hollow armature coils 5A, 5B.

On the stator base 3, there is arranged a pattern 3e for providing for electric continuity of those hollow armature coils 5A, 5B, Hall sensor, and drive circuit component D according to the prescribed circuit. Furthermore, in this pattern 3e, a pattern is formed for connecting the terminals of the hollow armature coils 5A and 5B, drive circuit component D, Hall sensor, and the like. Electric power is fed to those hollow armature coils 5A, 5B, Hall sensor, and drive circuit component D from a pattern provided in the power feed terminal portion 3d.

Necessary pattern plating is performed to facilitate soldering to the connecting pattern for mounting the drive circuit component D, Hall sensor, and the like. In order to form this pattern plating, electricity necessary for the plating is supplied to the pattern extending from the power feed terminal portion 3b via the power feed terminal portion 3b. In order to apply electricity to all areas to be plated, the pattern includes internal plating connection traces 3p which effect distribution of electricity for plating but which are subsequently opened in order to permit the stator circuit to operate.

Guide holes 3c, in addition to positioning the hollow armature coils 5A and 5B, also serve to cut a portion of the plated lines corresponding to the plating connection traces which is a specific feature of the invention of the present application. A cutting position of the plating connection traces which is outside an area of the hollow armature coils 5A and 5B is difficult to select in a stator base which has a diameter of about 9 mm because of the limited area. However, coinciding the cutting positions with the guide holes 3c permits the plating connection traces 3p to be opened while not consuming space which can otherwise be used for the stator circuit.

An insulating structure such as a recess or a resist is provided in the bracket adjacent to the cutting portion in order to avoid problems associated with insulation from the bracket 1, which are caused by the appearance of burrs in the zone where the plated line of the plating connection traces 3p is cut.

The stator base 8 having the hollow armature coils 5A, 5B, Hall sensor, and drive circuit component D mounted thereon is fixed to the bracket 3 with a UV-curable adhesive 4 from the periphery of the reinforcing member 1b to the two hollow armature coils 5A, 5B, Hall sensor H, and drive circuit component. Here, the UV-curable adhesive 4 is necessary around the hollow armature coils 5A, 5B and reinforcing member 1b, and an injected amount thereof is so controlled that it does not bulge out above the member (here, the hollow armature coils) defining the minimum gap in the gap portion formed with the opposing rotor.

Those members constituting the stator do not overlap in a plan view, can be formed thin, and impact resistance is increased with the UV-curable adhesive.

In the figures, the reference symbol 3d stands for another cutting hole for a plated line, and the bonding strength of the stator base 3 and the bracket 1 is increased by this cutting hole 3d and guide holes 3c.

In the above-described embodiments, the present invention was applied to a fixed-shaft configuration, but obviously it can be also applied to a rotary shaft configuration, and not only to a vibration motor, but also to a usual rotary-type motor.

The present invention can be implemented in a variety of modes, without departing from technological essence and scope thereof. Therefore, the above-described embodiments are merely examples and should not be construed as limiting the present invention. The technological scope of the present invention is shown in the claims and is not restricted by the detailed description of the invention. The disclosure of Japanese Patent Application number JP2003-351920, to which the present application claims priority, is hereby incorporated by reference.

What is claimed is:

1. A stator for a brushless motor, comprising:
   a drive circuit;
   a bracket formed from a nonmagnetic or weakly magnetic metal plate, having a shaft support portion disposed in a central portion;
   a power feed terminal installation portion in an outer peripheral portion of the bracket;
   a brush base including a printed wiring board mounted on one surface of the bracket including conductors for a drive circuit for driving the brushless motor and a power feed terminal portion mounted on the power feed terminal installation portion;
   hollow armature coils mounted on the brush base, and
   a drive circuit component for controlling electric current flowing in the hollow armature coil mounted on the printed wiring board;
   the printed wiring board having a printed wiring plating trace forming a connection land providing continuity from the power feed terminal portion to lands on which said drive circuit component is mounting for effecting plating of the lands, and a separation hole cutting the printed wiring plating trace formed in the brush base after plating; and
   an adhesive resin applied to the surface of the brush base where the drive circuit component is disposed, the adhesive resin adhering to the bracket via the separation hole, and the brush base being thereby fixed to the bracket.

2. The stator according to claim 1, wherein said hollow armature coils are flat coils and said separation hole is provided in an inner-diameter position of the hollow armature coils.

3. An axial-gap brushless motor, comprising the stator according to claim 1 or 2 and an axial-gap eccentric rotor rotatably attached to the stator via a shaft, wherein the eccentric rotor is composed of an axial-gap magnet having a plurality of magnetic poles in a rotor yoke and an eccentric weight rotating integrally with the rotor yoke and magnet, and a cover composed of a nonmagnetic or weakly magnetic metal sheet and covering the eccentric rotor fixed to the stator.

4. A brushless motor comprising:
   a bracket;
   a drive controlling IC for controlling operation of the brushless motor;
   a printed circuit including circuit traces for a circuit effecting operation of the brushless motor including power input lands for providing power for driving the brushless motor, lands mounting the drive controlling IC and at least one plating circuit trace cut by a separation hole in the printed circuit after the plating trace is used to supply power to the lands mounting the drive controlling IC during plating;
   an armature coil defining an aperture aligned with the separation hole and connected to the circuit traces;
   an adhesive material applied at the separation hole interconnecting together the armature coil, the printed circuit, and the bracket; and
   a rotor rotatably mounted on the bracket.

5. The brushless motor of claim 4 wherein the printed circuit is a flexible printed circuit.

6. The brushless motor of claim 5 further comprising a cover covering the rotor and the printed circuit.

7. The brushless motor of claim 6 wherein the cover is mounted to a periphery of the bracket.

8. The brushless motor of claim 7 wherein the cover includes a mount for rotatably mounting the rotor in conjunction with the bracket.

9. The brushless motor of claim 4 further comprising a cover covering the rotor and the printed circuit.

10. The brushless motor of claim 9 wherein the cover is mounted to a periphery of the bracket.

11. The brushless motor of claim 10 wherein the cover includes a mount for rotatably mounting the rotor in conjunction with the bracket.

* * * * *